United States Patent [19] [11] 4,278,599
Clark [45] Jul. 14, 1981

[54] MONO AZO DYES FROM (2-ALKOXY-5-ALKANOYLAMINOANILINO)ALKOXY OR ARYLOXY ALKANES

[75] Inventor: Gary T. Clark, Kingsport, Tenn.
[73] Assignee: Eastman Kodak Company, Rochester, N.Y.
[21] Appl. No.: 86,115
[22] Filed: Oct. 18, 1979
[51] Int. Cl.³ .................... C07C 107/06; C09B 29/14
[52] U.S. Cl. ............................... 260/207; 260/207.1
[58] Field of Search ............................ 260/207, 207.1
[56] References Cited
U.S. PATENT DOCUMENTS

| | | | |
|---|---|---|---|
| 3,122,410 | 2/1964 | Mueller et al. | 8/26 |
| 3,250,763 | 5/1966 | Gies et al. | 260/207 |
| 3,955,919 | 5/1976 | Fujii et al. | 8/26 |
| 4,076,706 | 2/1978 | Clark | 260/207 |
| 4,083,846 | 4/1978 | Leverenz | 260/207 |
| 4,111,930 | 9/1978 | Meybeck | 260/207 |

Primary Examiner—A. Lionel Clingman
Attorney, Agent, or Firm—Donald W. Spurrell; Daniel B. Reece

[57] ABSTRACT

Disperse dyes from cyano, chloro, or bromodinitroaniline and (2′-methoxy-5′-alkanoylaminoanilino)alkoxy or aryloxy alkanes impart blue shades with excellent colorfastness properties and shade reproducibility on polyester fibers. The dyes of this invention have excellent dyeing properties by either heat fixation on polyester fibers or exhaust (boil and pressure) methods of application on acetate, triacetate, polyester, or polyamide fibers.

These dyes are represented by the following general structure.

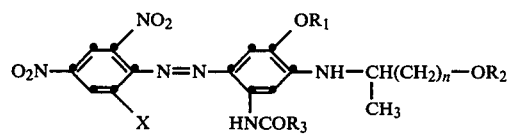

wherein
X is halogen or cyano;
$R_1$ and $R_3$ are straight or branched alkyl of 1–10 carbons;
$R_2$ is 1–4C alkyl optionally substituted with lower alkoxy or aryloxy, aryl or optionally substituted aryl; and
n is an integer 1–4.

6 Claims, No Drawings

MONO AZO DYES FROM (2-ALKOXY-5-ALKANOYLAMINOANILINO)ALKOXY OR ARYLOXY ALKANES

This invention concerns disperse dyes from cyano, chloro or bromodinitroaniline and (2'-methoxy-5'-alkanoylaminoanilino)alkoxy or aryloxy alkanes, which impart blue shades with excellent colorfastness properties on polyester fibers. The dyes of this invention have excellent dyeing properties by either heat fixation on polyester fibers or exhaust (boil and pressure) methods of application on polyester acetate, triacetate, or polyamide fibers. The fastness, dyeing properties and shade reproducibility of these dyes apparently result from the unobvious

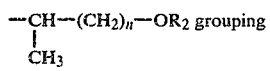

grouping on the coupler. These dyes are represented by the following general structure.

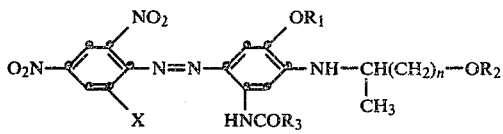

wherein
X is halogen or cyano;
$R_1$ and $R_3$ are straight or branched alkyl of 1–10 carbons;
$R_2$ is 1–4C alkyl optionally substituted with lower alkoxy or aryloxy, aryl or optionally substituted aryl; and
n is an integer 1–4. The term "lower" as used herein means 1–6 carbons.

Of the three disperse dyeable fibers (polyester, polyamide, and cellulose acetate), polyester fibers are the most difficult to dye. Polyamide and cellulose acetate are dyed at the boil (atmospheric 212° F.), but with polyester fibers, chemical auxiliaries such as carriers and the like have to be added to the dyebath to increase the rate of dyeing and the color yield on this substrate. Also, higher temperature dyeing techniques such as Thermosol (400°–425° F.) and pressure dyeing (220°–275° F.) are used for achieving the same effects on polyester fibers. Besides color yield, rate of dyeing, and colorfastness such as light and wash of the disperse dye for polyester fibers, the dyer is interested in shade reproducibility regardless of his particular dyeing equipment and his method of application on polyester fibers. This invention is concerned therefore with disperse dyes having the above desired properties as applied to polyester fibers either by heat fixation or exhaust methods of application and in a variety of dyeing equipment.

A preferred group of the above dyes have the formula

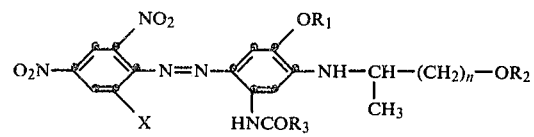

wherein
X is Br, Cl or CN;
$R_1$ and $R_3$ are methyl;
$R_2$ is selected from 1–4C alkyl and aryl; and
n is 1.

The dyes of this invention produce bright, fast blue shades on polyester fibers and have excellent light, wash, solvent, crock, gas, acid or basic perspiration, and sublimation fastness on the above substrate. The dyes also exhibit excellent pH stability over a range of 4–10 when applied to polyester above the boil (220°–275° F.). The build-up characteristics or color yield, exhaustion of dye onto the fiber, and rate of dyeing of these dyes are superior to the nearest comparable dyes. The good reproducibility of these dyes is reflected in their leveling (migration) and barre coverage abilities on polyester fabrics. From the above properties, these dyes have excellent shade reproducibility by all methods of application (boil, pressure, heat fixation) on polyester fibers.

Preparation of Coupler—The couplers of this invention can be prepared from either 2-methoxy-5-acetamidoaniline or 2-nitro-4-acetamidoanisole and the methyl alkoxy or aryloxy alkyl ketone with hydrogen and a catalyst. The preparation for 2-(2'-methoxy-5'-acetamidoaniline)-3-methoxypropane is as follows. A mixture of 22.0 g (0.1 mole) of 2-nitro-4-acetamidoanisole, 80 ml of ethanol, 10.0 g (0.113 mole) of methoxyacetone, 2.0 g of 5% Pt/carbon, and 0.5 g of p-toluenesulfonic acid is treated at 165° C. and 1000 psi of hydrogen until the uptake of hydrogen ceases. The solvent and catalysts are removed to yield the following coupler:

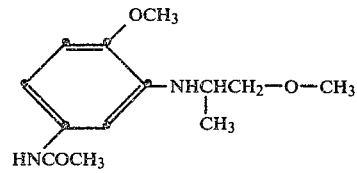

This invention will be further illustrated by the following examples and Table I although it will be understood that these examples are included merely for purposes of illustration and are not intended to limit the scope of the invention.

EXAMPLE 1

A. Diazotization of 2-Bromo-4,6-Dinitroaniline

To a solution of nitrosylsulfuric acid [from $NaNO_2$ (18.0 g) and $H_2SO_4$ (125 ml)] is added 1-5 acid (100 ml—1 part propionic acid and 5 parts acetic) below 20° C. The solution is cooled to 0–5° C. and 65.5 grams (0.25 mole) of 2-bromo-4,6-dinitroaniline is dissolved in 200 ml of $H_2SO_4$ is added dropwise below 5° C. The reaction is allowed to stir at 0–5° C. for two hours to complete the diazotization.

B. Coupling

To a solution of 1.26 g (0.005 mole) of 2-(2'-methoxy-5'-acetamidoanilino)-3-methoxypropane in 75 ml of 1-5 acid is added 0.005 mole of the above diazo solution with stirring below 20° C. The reaction is allowed to stand for one hour, poured into water, collected by filtration, washed with water, and air-dried to yield the following dye:

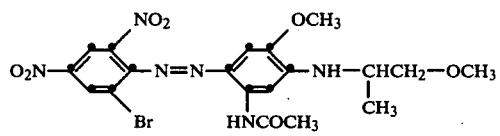

This dye imparts a colorfast navy blue shade to polyester fibers.

C. Cyanide Displacement

A solution of sodium dicyano cuprate [NaCu(CN)$_2$] in dimethylformamide is added with stirring at about 105° C. to a solution of 0.94 g (0.002 mole) of the above dye from Example 1-B in 3 ml of dimethylformamide. After the addition is complete, the mixture is heated at about 105° C. for about 15 minutes. To the mixture is added 3 ml isopropyl alcohol. The mixture is allowed to cool to room temperature, collected by filtration, washed with water, and air-dried to yield the following dye 1:

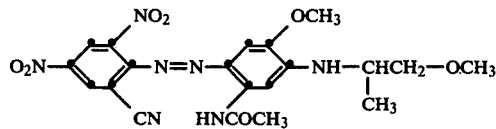

This dye imparts a colorfast greenish-blue shade to polyester.

The following table further illustrates the invention.

TABLE 1

| Dye | X  | n | R$_2$             | R$_1$      | R$_3$    |
|-----|----|---|-------------------|------------|----------|
| 2   | Cl | 1 | CH$_3$            | CH$_3$     | CH$_3$   |
| 3   | Br | 1 | C$_6$H$_5$        | CH$_3$     | CH$_3$   |
| 4   | Cl | 1 | C$_6$H$_5$        | C$_2$H$_5$ | CH$_3$   |
| 5   | CN | 2 | C$_6$H$_5$        | CH$_3$     | C$_2$H$_5$ |
| 6   | Cl | 1 | C$_2$H$_4$OCH$_3$ | CH$_3$     | CH$_3$   |
| 7   | Br | 1 | C$_2$H$_4$OCH$_3$ | CH(CH$_3$)$_2$ | CH$_3$ |
| 8   | CN | 1 | C$_2$H$_4$OCH$_3$ | CH$_3$     | CH$_3$   |
| 9   | Br | 3 | C$_2$H$_4$OC$_2$H$_5$ | CH$_3$ | CH$_3$   |
| 10  | Br | 1 | C$_2$H$_4$OC$_2$H$_4$OC$_2$H$_5$ | C$_4$H$_9$ | CH$_3$ |
| 11  | Br | 1 | C$_6$H$_4$OCH$_3$ | CH$_3$     | CH$_3$   |
| 12  | CN | 1 | C$_6$H$_4$OCH$_3$ | CH$_3$     | CH$_3$   |
| 13  | Br | 1 | CH$_3$            | C$_{10}$H$_{21}$ | C$_4$H$_9$ |
| 14  | CN | 2 | CH$_3$            | CH$_3$     | C$_4$H$_9$ |
| 15  | Br | 1 | CH$_3$            | CH$_3$     | C$_3$H$_7$ |
| 16  | CN | 1 | CH$_3$            | CH$_3$     | C$_8$H$_{17}$ |
| 17  | Br | 1 | C$_6$H$_4$Cl      | CH$_3$     | CH$_3$   |
| 18  | Br | 4 | C$_6$H$_4$OC$_6$H$_5$ | CH$_3$ | CH$_3$   |
| 19  | Cl | 1 | C$_2$H$_5$        | CH$_3$     | CH$_3$   |
| 20  | CN | 1 | C$_2$H$_5$        | CH$_3$     | CH$_3$   |
| 21  | Br | 1 | C$_2$H$_5$        | CH$_3$     | CH$_3$   |
| 22  | CN | 1 | CH$_2$C$_6$H$_5$  | CH$_3$     | CH$_3$   |
| 23  | CN | 2 | C$_2$H$_4$OC$_6$H$_5$ | CH$_3$ | CH$_3$   |
| 24  | CN | 1 | C$_6$H$_4$—p-Cl   | CH$_3$     | CH$_3$   |

The invention has been described in detail with particular reference to certain preferred embodiments thereof, but it will be understood that variations and modifications can be effected within the spirit and scope of the invention.

I claim:

1. The dye of the formula

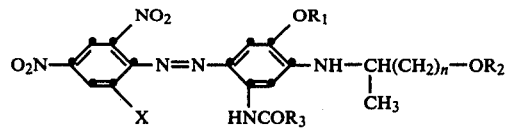

wherein
X is halogen or cyano;
R$_1$ and R$_3$ are straight or branched alkyl of 1–10 carbons;
R$_2$ is 1–4C alkyl which may be substituted with lower alkoxy or aryloxy, aryl or substituted aryl; and
n is an integer 1–4.

2. The dye according to claim 1 wherein X is Br, Cl or CN; R$_1$ and R$_3$ are methyl; R$_2$ is selected from 1–4C alkyl and aryl; and n is 1.

3. The dye according to claim 1 of the formula

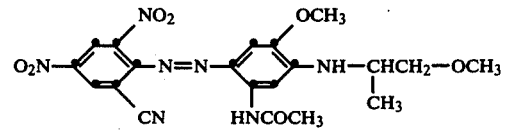

4. The dye according to claim 1 of the formula

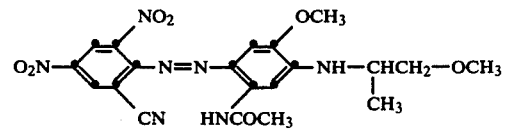

5. The dye according to claim 1 of the formula

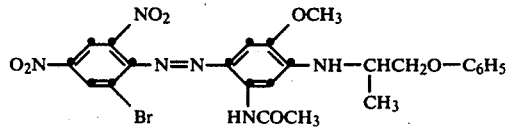

6. The dye according to claim 1 of the formula

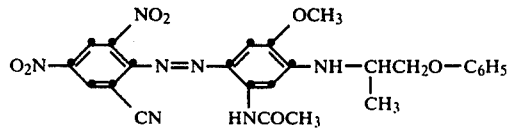

* * * * *

Notice of Adverse Decision in Interference

In Interference No. 100,922, involving Patent No. 4,278,599, G. T. Clark, MONO AZO DYES FROM (2-ALKOXY-5-ALKANOYLAMINOANILINO) ALKOXY OR ARYLOXY ALKANES, final judgment adverse to the patentee was rendered Apr. 14, 1983, as to claims 1--3, 5 and 6.
[*Official Gazette July 12, 1983.*]